United States Patent [19]

Andrews

[11] 4,394,492
[45] Jul. 19, 1983

[54] CURING EPOXIDE RESINS IN AN AQUATIC ENVIRONMENT

[75] Inventor: Christopher M. Andrews, Cambridge, England

[73] Assignee: Ciba-Geigy Corporation, Ardsley, N.Y.

[21] Appl. No.: 390,466

[22] Filed: Jun. 21, 1982

[30] Foreign Application Priority Data

Jun. 30, 1981 [GB] United Kingdom ................ 8120155

[51] Int. Cl.³ ........................ C08L 61/00; C08L 61/06
[52] U.S. Cl. ..................................... 525/504; 528/12; 528/20; 528/27; 528/88; 528/123
[58] Field of Search ................... 525/504; 528/12, 20, 528/27, 88, 123

[56] References Cited

U.S. PATENT DOCUMENTS 3,297,608 1/1967 Noshay et al. ................... 528/123 X
3,455,725 7/1969 Jex et al. .......................... 525/504 X
3,847,860 11/1974 Seiler et al. ...................... 525/504 X
3,979,362 9/1976 Blount .............................. 528/12 X

FOREIGN PATENT DOCUMENTS 867487 5/1961 United Kingdom .

Primary Examiner—Lucille M. Phynes
Attorney, Agent, or Firm—Harry Falber

[57] ABSTRACT

Curable compositions contain an epoxide resin and a silamine of the general formula

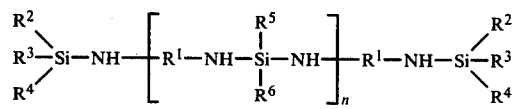

wherein
$R^1$ represents the divalent residue of an aromatic or araliphatic diprimary amine after removal of the two primary amino groups,
$R^2$, $R^3$, $R^4$, $R^5$, and $R^6$, which may be the same or different, represent alkyl or aryl groups, and
n represents zero or an integer of from 1 to 10.

These compositions are stable for prolonged periods in the absence of water, but cure rapidly at room temperature or at elevated temperatures in the presence of water.

8 Claims, No Drawings

CURING EPOXIDE RESINS IN AN AQUATIC ENVIRONMENT

BACKGROUND OF THE INVENTION

This invention relates to curable epoxide resin compositions, to a process for their cure, and to cured products obtained by this process.

It is known that epoxide resins, i.e., substances containing on average more than one 1,2-epoxide group per molecule, may be cured by reaction with various classes of substances to form cross-linked, infusible, insoluble products having valuable technical properties. Typical curing agents include polyamines.

These are useful curing agents, and may be employed to cure epoxide resins at room temperature or at elevated temperatures. They suffer from the drawback, however, that curing commences as soon as they are mixed with the epoxide resin and so it is not possible to make 'one shot' mixtures, i.e., mixtures of epoxide resins and such hardeners which remain stable on storage until required for use.

British Pat. No. 867 487 describes compounds prepared by the reaction of at least one epoxide group and a silicon-nitrogen compound (a 'silamine'), itself prepared by reaction of a halosilane with ammonia or a primary amine. Suitable halosilanes used in the reaction are of the generic formula

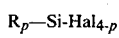  I where R represents a hydrogen atom or an organic group, and p is 1, 2, or 3. Suitable amines include methylamine, ethylamine, allylamine, ethylenediamine, hexamethylenediamine, aniline, p-phenylenediamine, and benzylamine. It is stated that silamines will cure epoxide resins at room temperature and that silamines made from primary amines tend to react with epoxy resins somewhat more rapidly than silamines derived from ammonia. The combination of epoxy resin and silamine has an exceedingly short 'shelf-life' it is said, and the components are mixed only immediately before use. However, it is further stated that certain of the silamines may be used as curing agents for epoxide resins wherein the mixture of curing agent and resin has a shelf-life of days or weeks. From what is stated previously it is implied that these less-active silamines are those derived from ammonia.

That specification gives no example of a silamine prepared from a monohalosilane and no example of a silamine prepared from a diamine although such are included within the general description. Further, that specification indicates that no mixture of an epoxide and a silamine would be stable for longer than a few weeks.

We have now found that combinations of epoxide resins with silamines derived from a monohalosilane and a di- or polyaromatic or araliphatic amine are stable in the absence of moisture for several months at room temperature and at elevated temperatures up to about 80° C. Such combinations will then cure rapidly at room temperature or elevated temperature when contacted with water. These combinations therefore form a storage-stable but rapidly-curing 'one-shot' epoxide resin composition of particular use when curing in water is required.

SUMMARY OF THE INVENTION

One aspect of this invention comprises curable compositions comprising
(a) an epoxide resin and
(b) a silamine of the formula

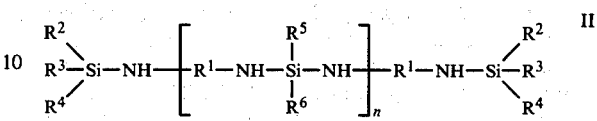

where
$R^1$ represents the divalent residue of an aromatic or araliphatic diprimary amine after removal of the two primary amino groups,
$R^2$, $R^3$, $R^4$, $R^5$, and $R^6$, which may be the same or different, each represent an alkyl or aryl group, and
n represents zero or an integer of from 1 to 10.

DESCRIPTION OF THE PREFERRED EMBODIMENTS

The residues $R^1$ preferably have from 6 to 20 carbon atoms and include xylylene such as m-xylylene, bis(-phenylene)methane such as bis(p-phenylene)methane, bis(phenylene) sulphone such as bis(p-phenylene) sulphone, 2,2-bis(phenylene)propane such as 2,2-bis(p-phenylene)propane, and phenylene such as 1,3-phenylene.

Suitable groups $R^2$, $R^3$, $R^4$, $R^5$, and $R^6$ include alkyl groups of 1 to 8 carbon atoms, such as methyl, ethyl, and n-propyl groups, and aryl groups of 6 to 10 carbon atoms, such as phenyl groups, optionally substituted by one or more alkyl groups of 1 to 4 carbon atoms each or by one or more halogen atoms. In the preferred compounds of formula II n represents zero or 1 and $R^2$ to $R^6$ each denote a methyl group.

Further aspects of this invention provide a process for curing an epoxide resin which comprises forming a mixture of the epoxide resin with a silamine of formula II and contacting this mixture with water at ambient or elevated temperature, and cured products made by this process.

Silamines of formula II may be prepared by reaction of a primary diamine of formula $$H_2N-R^1-NH_2 \quad \quad III$$

where $R^1$ is as hereinbefore defined, with a monohalosilane of formula

  IV and optionally also a dihalosilane of formula

  V where
$R^2$, $R^3$, $R^4$, $R^5$, and $R^6$ are as hereinbefore defined and X represents a halogen, preferably a chlorine, atom.

In this preparation the amine (III), the monohalosilane (IV), and the dihalosilane (V) are used in the molar ratio n+1:2:n, where n is as hereinbefore defined. This reaction is effected under anhydrous conditions by heating the reactants, usually at 50° to 150° C., for a period of from 30 minutes to 5 hours, especially for 1 to 2 hours, in an inert solvent such as an aromatic hydrocarbon, an ether, a halogenated hydrocarbon, or a ketone, and in the presence of an acid acceptor such as a tertiary amine, especially pyridine or triethylamine.

Suitable diprimary amines of formula III which may be used in preparing silamines of formula II include m-phenylenediamine, bis(p-aminophenyl)methane, bis(p-aminophenyl) sulphone, 2,2-bis(p-aminophenyl)propane, and m-xylylenediamine. Preferred monohalosilanes of formula IV include trimethylchlorosilane, tri-n-propyl-chlorosilane, triphenylchorosilane, trimethylbromosilane, and trimethyliodosilane. Trimethylchlorosilane is particularly preferred. A preferred dihalosilane of formula V is dimethyldichlorosilane.

Epoxide resins which may be employed in these compositions as component (a) are preferably those containing groups of formula

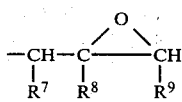

VI directly attached to atoms of oxygen, nitrogen, or sulphur, where either $R^7$ and $R^9$ each represent a hydrogen atom, in which case $R^8$ denotes a hydrogen atom or a methyl group, or $R^7$ and $R^9$ together represent —$CH_2CH_2$—, in which case $R^8$ denotes a hydrogen atom.

As examples of such resins may be mentioned polyglycidyl and poly($\beta$-methylglycidyl) esters obtainable by reaction of a compound containing two or more carboxylic acid groups per molecule with epichlorohydrin, glycerol dichlorohydrin, or $\beta$-methylepichlorohydrin in the presence of an alkali. Such polyglycidyl esters may be derived from aliphatic polycarboxylic acids, e.g., oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly($\beta$-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol, and poly(epichlorohydrin); from cycloaliphatic alcohols such as resorcitol, quinitol, bis(4-hydroxycyclohexyl)-methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl) sulphone, 1,1,2,2-tetrakis(4-hydroxyphenyl)ethane, 2,2-bis(4-hydroxyphenyl)propane, 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert.butylphenol.

Poly(N-glycidyl) compounds include, for example, those obtained by dehydrochlorination of the reaction products of epichlorohydrin with amines containing at least two amino-hydrogen atoms, such as aniline, n-butylamine, bis(4-aminophenyl)methane, and bis(4-methylaminophenyl)methane; triglycidyl isocyanurate; and N,N'-diglycidyl derivatives of cyclic alkylene ureas, such as ethyleneurea and 1,3-propyleneurea, and of hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl) ether.

Examples of epoxide resins having groups of formula VI where $R^7$ and $R^9$ conjointly denote a —$CH_2CH_2$— group are bis(2,3-epoxycyclopentyl) ether, 2,3-epoxycyclopentyl glycidyl ether, and 1,2-bis(2,3-epoxycyclopentyloxy)ethane.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicylic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

If desired, a mixture of epoxide resins may be used.

Preferred epoxide resins are polyglycidyl ethers, polyglycidyl esters, and N,N'-diglycidylhydantoins. Specific preferred resins are polyglycidyl ethers of 2,2-bis(4-hydroxyphenyl)propane, of bis(4-hydroxyphenyl)methane, or of a novolak formed from formaldehyde and phenol, or phenol substituted in the ring by one chlorine atom or by one alkyl hydrocarbon group containing from one to nine carbon atoms, and having a 1,2-epoxide content of more than 0.5 equivalent per kilogram.

An effective, i.e. a curing, amount of the silamine must be used. Normally there will be used from about 0.7 to about 1.4 theoretical amino-hydrogen equivalents of the silamine of formula II per 1,2-epoxide equivalent of the epoxide resin. By the term "theoretical amino-hydrogen equivalents", as used in the present specification and claims, is meant the number of amino-hydrogen equivalents present after removal of substantially all the silyl groups by hydrolysis, each molecule of the silamine affording 4(1+n) such equivalents.

Curing can be carried out, depending on the desired rate of cure, at room temperature (18° to 25° C., for example) or at higher temperatures, up to about 100° C.

Water required to initiate the curing reaction may be obtained in a variety of ways. It is preferred that the resin-silamine mixture be placed in contact with liquid water, either directly or through a semi-permeable membrane. Alternatively, the composition may be contacted with a material that contains water, for example, wood or a porous material such as concrete or brickwork.

The new compositions may further contain suitable plasticisers such as dibutyl phthalate and dioctyl phthalate, inert diluents such as tars and bitumen and so-called reactive diluents, especially monoepoxides such as n-butyl glycidyl ether, iso-octyl glycidyl ether, phenyl glycidyl ether, cresyl glycidyl ethers, glycidyl esters of mixed tertiary, aliphatic, monocarboxylic acids, glycidyl acrylate, and glycidyl methacrylate. They may also contain additives such as fillers, reinforcing materials, colouring matter, flow control agents, flame inhibitors, and mould lubricants. Suitable extenders, fillers, and reinforcing materials are, for example, glass fibres, carbon fibres, ballotini, mica, quartz flour, calcium carbonate, cellulose, kaolin, wollastonite, colloidal silica having a large specific surface area, powdered poly(vinyl chloride), and powdered polyolefin hydrocarbons such as polyethylene and polypropylene.

The curable compositions of this invention may be used as laminating resins, paints and lacquers, impregnating and casting resins, moulding compositions, putties and sealing compounds, potting and insulating compounds for the electrical industry, and adhesives, and also in the manufacture of such products.

The following Examples illustrate the invention.

Silamines used in these Examples were prepared as follows:

Silamine I

Bis(4-aminophenyl)methane (20 g; 0.1 mole) was mixed with triethylamine (20.2 g; 0.2 mole) in dry toluene (100 ml). Trimethylchlorosilane (21.7 g; 0.2 mole) was added dropwise to the stirred mixture over 1 hour, and stirring was continued at room temperature for a further 5 hours. Next, the mixture was heated under reflux for 1 hour. The mixture was cooled, filtered to remove triethylamine hydrochloride, and the toluene was distilled off in vacuo from a water bath at 80° C. The residue, bis(4-(trimethylsilylaminoZ)phenyl)methane, weighed 32.5 g, and is hereinafter referred to as 'Silamine I'. This product has a theoretical amino-hydrogen equivalent weight of 85.5, i.e., its theoretical amino-hydrogen content is 11.69 equivalents/kg.

Silamine II m-Phenylenediamine (10.8 g; 0.1 mole) and triethylamine (20.2 g; 0.2 mole) in dry toluene (100 ml) were stirred and treated with trimethylchlorosilane (21.7 g; 0.2 mole) which was added dropwise over 1 hour. Stirring was continued for a further hour, and the mixture was then heated under reflux for 1 hour. After cooling and filtering the product, the solvent was evaporated to leave 24.2 g of m-bis(trimethylsilylamino)benzene, which is hereinafter referred to as Silamine II. This product has a theoretical amino-hydrogen equivalent weight of 63, i.e., its theoretical amino-hydrogen content is 15.87 equivalents/kg.

Silamine III

Bis(4-aminophenyl)methane (40 g; 0.2 mole) and triethylamine (40.4 g; 0.4 mole) in dry tolune (200 ml) were stirred and treated with a mixture of trimethylchlorosilane (21.7 g; 0.2 mole) and dimethyldichlorosilane (12.9 g; 0.1 mole) which was added dropwise over 1 hour. Stirring was continued for a further hour and the mixture was then heated under reflux for 2 hours, filtered, and the solvent was distilled off to leave 54 g of 'Silamine III' which is a mixture having an average structure of formula II in which $R^1$ is of formula

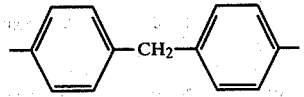

$R^2$, $R^3$, $R^4$, $R^5$, and $R^6$ all denote methyl groups, and n denotes 1. This product, of average structure dimethyl-bis(p-(p'-(trimethylsilylamino)benzyl)phenylamino)silane, has a theoretical amino-hydrogen equivalent weight of 74, i.e., its theoretical amino-hydrogen content is 13.5 equivalents/kg.

Silamine IV m-Xylylenediamine (12.6 g; 0.1 mole) and triethylamine (20.2 g; 0.2 mole) were stirred in dry toluene (100 ml) and treated over 1 hour with trimethylchlorosilane (21.7 g; 0.2 mole). After the mixture had been stirred for a further 10 hours it was heated under reflux for 1 hour, cooled, and filtered. The filtrate was evaporated to give 25.2 g of 'Silamine IV'. This product, 1,3-bis(trimethylsilylaminomethyl)benzene has a theoretical amino-hydrogen equivalent weight of 70, i.e., its theoretical amino-hydrogen content is 14.3 equivalents/kg.

'Epoxide resin I' denotes a polyglycidyl ether of 2,2-bis(4-hydroxyphenyl)propane having a 1,2-epoxide content of 5.2 equivalents/kg and a viscosity at 21° C. of 24.5 Pa s.

'Epoxide resin II' denotes butane-1,4-diol diglycidyl ether having a 1,2-epoxide content of 9.0 equivalents/kg.

'Epoxide resin III' denotes diglycidyl hexahydrophthalate, of 1,2-epoxide content 6.5 equivalents/kg.

EXAMPLE 1

Into each of two glass containers was placed a mixture of Silamine I (4.5 g; 0.052 theoretical amino-hydrogen equivalent) and Epoxide resin I (10 g; 0.052 epoxide equivalent). One container was sealed with a polyethylene stopper and left at ambient temperature for three months. The mixture showed no signs of curing, remaining a mobile clear liquid throughout this period. The mixture in the other container was treated with an equal volume of water; the water remained separate, forming an upper layer over the silamine-resin mixture. This mixture solidified within 4 to 5 days at ambient temperature.

EXAMPLE 2

Example 1 was repeated, with other mixtures of resins and silamines. The mixtures used, and the results obtained, are shown in the Table. The epoxide and theoretical amino-hydrogen contents contained in the mixtures are, in the first three, 0.052 epoxide equivalent and 0.052 amino-hydrogen equivalent; 0.0396 epoxide equivalent and 0.052 amino-hydrogen equivalent; and 0.142 epoxide equivalent and 0.140 amino-hydrogen equivalent in the fifth.

| Components | Amount (g) | Ambient temperature | |
|---|---|---|---|
| | | Cure time under water | Storage time in sealed container |
| Epoxide resin I | 10 | 4–5 days | >3 months |
| Silamine II | 3.3 | | |
| Epoxide resin I | 10 | 4–5 days | >3 months |
| Silamine II | 3.3 | | |
| Dibutyl phthalate | 3.0 | | |
| Epoxide resin I | 10 | 4–5 days | >3 months |
| Silamine I | 4.5 | | |
| Dibutyl phthalate | 3.0 | | |
| Epoxide resin I | 7.3 | 4–5 days | >3 months |
| Silamine II | 3.3 | | |
| Cresyl glycidyl ethers | 2.7 | | |
| Epoxide resin I | 10 | 1 day | >3 months |
| Epoxide resin II | 10 | | |
| Silamine I | 12 | | |

EXAMPLE 3

Example 1 was repeated, but both containers were sealed and placed in an oven at 80° C. After 50 hours there was no sign of curing having taken place. Water was added to one container, which was replaced in the oven. Cure of the resin-silamine lower layer occurred within 1 hour at 80° C. The other container, to which no water had been added, was placed in an oven at 150° C. Gelation occurred only after 8 hours at this temperature.

EXAMPLE 4

Epoxide resin I (10 g) and Silamine III (4 g, 0.054 theoretical amino-hydrogen equivalent) were mixed and part of the mixture was placed in a container, sealed, and placed in an oven at 80° C. The remainder of the mixture was applied as a coating to a glass plate, giving a layer approximately 20 μm thick. The coated plate was immersed in water maintained at 80° C. The coating hardened within 5 hours but the composition in the sealed container showed no sign of hardening after 20 hours at 80° C.

EXAMPLE 5

Epoxide resin I (10 g) and Silamine IV (3.7 g, 0.057 theoretical amino-hydrogen equivalent) were mixed and the mixture was divided between two containers. An equal volume of water was added to one of these containers, and both were then sealed and placed in an oven at 80° C. The mixture in the container with water gelled after 20 minutes whereas the contents of the other container gelled only after 3 hours.

EXAMPLE 6

A mixture of Epoxide resin III (10 g, 0.065 epoxide equivalent) and Silamine I (5 g, 0.058 theoretical amino-hydrogen equivalent), stored at room temperature, showed no sign of curing after 1 month. A similar mixture, freshly prepared, cured under water at 80° C. in less than 1 hour.

What is claimed is:

1. Curable compositions comprising
   (a) an epoxide resin and
   (b) a silamine of the formula

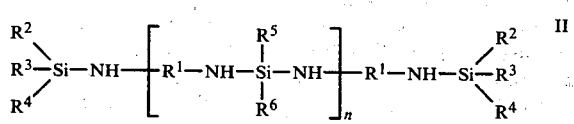

where
R$^1$ represents the divalent residue of an aromatic or araliphatic diprimary amine after removal of the two primary amino groups,
R$^2$, R$^3$, R$^4$, R$^5$, and R$^6$, which may be the same or different, each represent an alkyl group of 1 to 8 carbon atoms or an aryl group of 6 to 10 carbon atoms,
and
n represents zero or an integer of from 1 to 10.

2. The compositions of claim 1 wherein R$^1$ represents a said residue having from 6 to 20 carbon atoms.

3. The compositions of claim 1 wherein R$^1$ represents a xylylene, bis(phenylene)methane, bis(phenylene) sulfone, 2,2-bis(phenylene)propane, or a phenylene residue.

4. The compositions of claim 1 in which R$^2$, R$^3$, R$^4$, R$^5$, and R$^6$ each represent methyl, ethyl, n-propyl, phenyl, or phenyl substituted by at least one alkyl group of 1 to 4 carbon atoms or by at least one halogen atom.

5. The compositions of claim 1 in which n represents zero or 1.

6. The compositions of claim 1 which contain sufficient of the silamine to supply from 0.7 to 1.4 amino-hydrogen equivalents, calculated after removal of substantially all the silyl groups, per 1,2-epoxide equivalent of the epoxide resin.

7. The compositions of claim 1, in which the silamine is bis(4-(trimethylsilylamino)phenyl)methane, m-bis(-trimethylsilylamino)benzene, a mixture of average structure dimethylbis(p-(p'-trimethylsilylamino)benzyl)phenylamino)silane, or 1,3-bis(trimethylsilylaminomethyl)benzene.

8. A process for curing an epoxide resin which comprises contacting a mixture as claimed in claim 1 with water at ambient temperature or at a higher temperature up to 100° C.

* * * * *